Feb. 9, 1932.   C. J. ALLEN   1,844,051
MULCH PAPER
Filed May 21, 1930
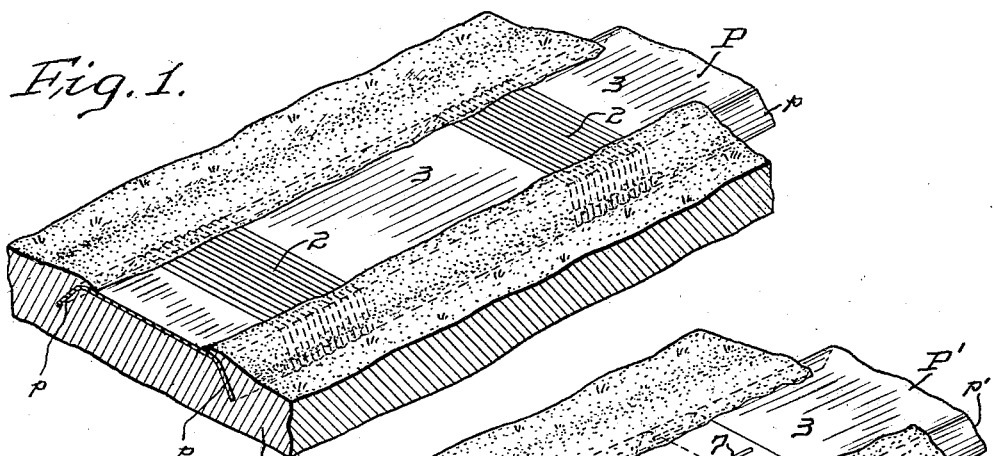
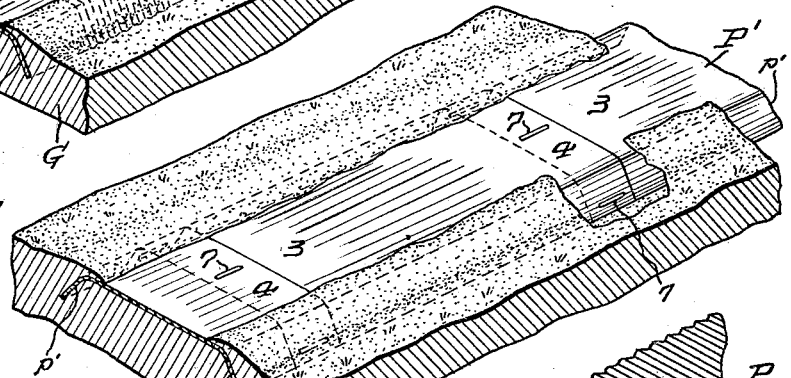
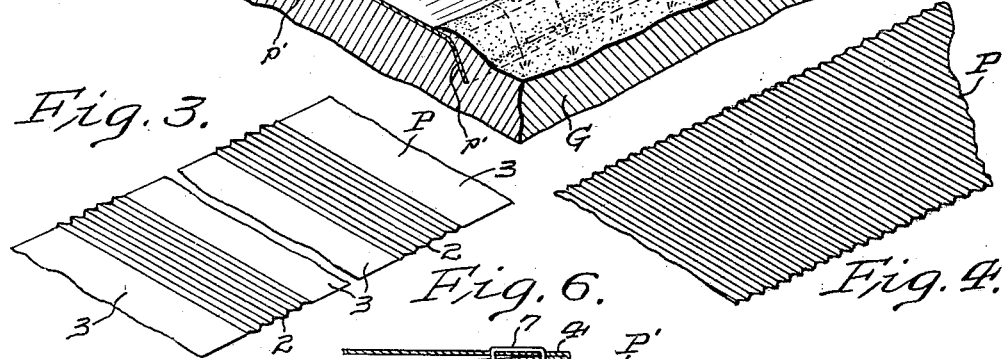
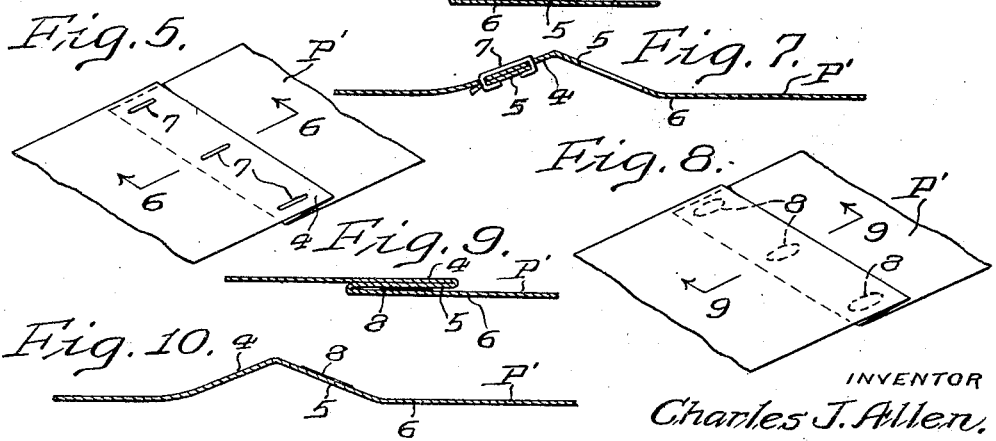
INVENTOR
Charles J. Allen.

Patented Feb. 9, 1932

1,844,051

UNITED STATES PATENT OFFICE

CHARLES J. ALLEN, OF MOORESTOWN, NEW JERSEY, ASSIGNOR TO S. L. ALLEN & CO., INC., OF PHILADELPHIA, PENNSYLVANIA, A CORPORATION OF PENNSYLVANIA

MULCH PAPER

Application filed May 21, 1930. Serial No. 454,220.

In certain sorts of plant cultivation it is becoming more and more the practice to cover the ground in the vicinity of the rows of plants with paper with the object, among other things, of checking the growth of weeds, retaining the moisture in the soil, and transmitting to the soil the solar heat absorbed by the paper covering. The paper utilized for this purpose is commercially known as "mulch" paper and is usually supplied by the manufacturers to the consumer in rolls of predetermined width and several hundred feet in length. The paper is then unrolled and laid upon the surface of the ground in as straight a line as possible, and when the end of the field is reached another strip is similarly laid adjacent the first row and so on until the desired area is covered, after which the seeds or plants are planted either between the strips of paper or through small holes cut at longitudinally spaced intervals at the center of each strip.

The laying of the paper may be performed either manually or, preferably, through the medium of a suitable machine which serves to support the roll of paper and lay it on the surface of the ground as the machine is propelled thereover. In order to retain the paper in proper position on the ground, various expedients are adopted, one of the most usual being to form a pair of suitably spaced-apart, parallel trenches in the surface of the ground and bend the edges of the paper downwardly thereinto as it is progressively laid, after which the earth thrown up from the trenches is piled back thereinto over the turned-down edges of the paper so as to hold the latter firmly in position, the center part of the paper between the bent-down portions thus lying substantially parallel to and adjacent the surface of the ground between the trenches. The formation of the trenches, the subsequent bending of the edges of the paper thereinto, and the covering of the edges with the earth is preferably performed simultaneously with the laying of the paper strip or sheet, but whatever be the particular means and method adopted for the purpose, the result is that after the paper is laid, the weight of the earth upon the turned-down edges thereof serves to prevent the paper from being displaced from its proper position by the wind or other causes.

However, if the strip of paper, which in large scale cultivating operations is frequently several hundred feet long, is torn or otherwise ruptured after it is laid, an opportunity is afforded for the wind to get between the paper and the surface of the ground with the result that the paper is lifted from contact with the latter and frequently blown away, torn apart, or at least displaced to such extent as to prevent the performance of its intended function. Additionally, rupturing of the paper at frequent intervals materially detracts from the ability of the paper to retain the moisture in the soil and also gives an opportunity for weeds to force their way above the latter, so that for these and other reasons it is highly desirable that after it is once laid the paper be preserved intact for as long a period as possible.

Necessarily, for economic reasons, the paper utilized for mulching must be as cheap as possible commensurate with reasonably satisfactory operation under practical conditions of use, and when laid in long strips in the manner just described, or in fact in any other manner which is commercially practicable, the contraction of the paper as a whole, particularly after being wetted by rain and then exposed to the rays of the sun, is considerable, with the result that as the edges of the paper are very firmly held in position by the superimposed earth or other means employed for that purpose, the center part of the paper which is directly exposed to the elements and thus tends to contract more than the buried edges, frequently tears at intervals either transversely or longitudinally away from the buried edges, thereby providing openings through which the wind can get beneath the paper as well as bringing about the other undesirable conditions to which I have briefly referred. It will of course be appreciated that if the edges of the paper were free to expand and contract equally with the exposed center part of the strip, the longitudinal contraction would have not particularly inimical result, but as the edges of the paper are buried in the ground to some extent and thus protected from the direct rays of the sun while in addition the superimposed earth or other means employed for holding them securely in position prevents free contraction of the edge portions of the strip, internal strains are set up in the latter which when in excess of the resistance of the paper itself cause the latter to give way.

As far as I am aware, it has hitherto been found impossible in the course of manufacture to minimize the inherent capacity of the paper to contract under the conditions to which it is necessarily exposed sufficiently to prevent this tearing or rupturing thereof at intervals, in consequence of which many vegetable and other growers are averse to employing mulching paper at all, considering the admitted advantages which can thereby be obtained as more than offset by the disadvantages arising from the tearing of the paper in the manner described. The possible market for the paper is therefore decreased and the benefits, both to the growers and to the public, which would arise from its more extended employment are correspondingly lessened.

The principal object of my invention, therefore, is to provide means for preventing the tearing of mulch paper under the conditions of use to which it is necessarily subjected. A further object of the invention is the provision of means adapted for this purpose which may readily be incorporated in mulching paper as at present manufactured; which do not materially increase the production cost thereof, and which are satisfactorily operative for the performance of their intended function.

Other objects, advantages and novel features comprehended by my invention are hereinafter more particularly mentioned or will be apparent to those skilled in the art from the following description of certain embodiments thereof as illustrated in the accompanying drawings.

In the said drawings, Fig. 1 is a fragmentary perspective view of a strip of mulch paper made in accordance with one form of my invention as it appears when laid in operative position, and Fig. 2 is a similar view of a strip of mulch paper made in accordance with another form thereof. Fig. 3 is a fragmentary perspective view of the paper shown in Fig. 1 before it is laid but after it is unrolled, and Fig. 4 is a similar view showing a modified form thereof. Fig. 5 is a fragmentary perspective view of the paper shown in Fig. 2 before it is laid but after it is unrolled; Fig. 6 is an enlarged longitudinal section thereof on the line 6—6 in Fig. 5, and Fig. 7 is a similar sectional view showing the same paper substantially as it appears after it has been laid and exposed to a predetermined amount of lengthwise contraction. Fig. 8 is a view generally similar to Fig. 5 showing still another form of the invention, and Figs. 9 and 10 are enlarged sectional views thereof respectively corresponding to Figs. 6 and 7. The same symbols of reference are used to designate corresponding parts throughout the several figures.

The paper usually employed for mulching purposes has a fairly thick body and is generally treated with some substance designed to make it more or less waterproof and enhance its toughness and wearing qualities, and a paper of this sort or, in fact, of any sort adapted for mulching is suitable for the purposes of my invention. In accordance with the latter I therefore provide the paper with means operative to permit longitudinal contraction thereof which, in the absence of such means, frequently results in the tearing of the paper in the manner heretofore described, and I may thus either so form the paper itself as to afford suitable inherent capacity for longitudinal yielding or else fold the paper transversely on itself at intervals and provide means for retaining the folds in normal position until the internal strains set up by the contraction of the paper exceed the retaining ability of said means so that the latter give way and allow the paper to lengthen longitudinally, thus relieving said strains and preventing rupture.

In accordance with the first of these principles I may therefore, as shown in Figs. 1 and 3, provide the paper P at suitable intervals with a series of transverse corrugations 2 during the course of manufacture. When the paper is rolled for delivery to the consumer these corrugations of course flatten out to a material extent, but when the paper is unrolled and laid they again assume or approach their original form and remain in that condition until contraction of the paper sets in. In Fig. 1 I have shown a strip of paper constructed in accordance with this form of the invention as it appears when laid upon the ground G; it will be noted that in this figure the lateral edge portions $p$—$p$ of the paper are bent down from the center portion and covered with a layer of earth to a relatively considerable depth while the center portion of the paper is entirely exposed. The edges are thus held securely by the weight of the superimposed earth while, on the other hand, they are sheltered from the rays of the sun and to some extent at least protected from the rain. The expansion and contraction of the edge portions of the paper are therefore different from the center portion as hitherto explained, and the strains set up in the paper thereby are thus non-uniform. Due to the presence of the corrugations, however, the longitudinal contraction is localized in the areas or intervals 3 between the corrugated portions since the latter expand longitudinally in correspondence with the extent of contraction in the non-corrugated areas, thus relieving the longitudinal strain which would otherwise be placed upon the strip as a whole and preventing tearing of the latter.

Instead of corrugating the paper transversely at intervals, I also may corrugate it throughout its entire length as shown in Fig. 4, but under most conditions I prefer to employ the spaced groups of corrugations as less paper is required to cover a given area, the paper rolls more snugly, and the result is equally satisfactory.

In the form of the invention shown in Figs. 5 to 8 inclusive and in accordance with the second of the principles above mentioned, I may fold the strip of paper transversely upon itself at suitable intervals instead of providing it with transverse corrugations, so that the strip P' comprises a plurality of adjacent overlaps or folds, 4, 5, 6 at longitudinally spaced points as best shown in Fig. 6, and then preferably secure together at least two of the adjacent folds in each group by any suitable means which may be of any form adapted for the performance of their intended function. Thus, said means may consist of wire staples 7 forced through at least two of the laps or folds and clinched over at their free ends which may be extended merely through the two upper laps or folds 4, 5 as shown in Fig. 6, or through all three laps, a plurality of the stables being preferably employed at each point at which the paper is folded and suitably spaced laterally of the latter as shown in Fig. 5 as, for example, by placing a staple adjacent each edge of the strip and one in the center. The paper is preferably folded and the staples secured therein during the course of manufacture and preparatory to its being rolled and delivered to the consumer; thereafter as the paper is laid upon the ground the staples or other fastening means serve to hold the various sets of folds together in normal position approximately as shown in Figs. 5 and 6 until the paper is subjected to a sufficient longitudinal contraction to tear out staples or equivalent fastening means, thus allowing the folds to separate and assume substantially the position indicated in Fig. 7 so as to relieve the strain on the paper in the areas 3' between the folds and preventing its rupture. Thus, as in the form of the invention shown in Figs. 1 and 3, the contraction strains are substantially localized in the said areas, and as the holding power of the staples or other fastening means is materially less than the pull or strain necessary to rupture the paper itself, the fold fastening means give way and relieve the strain on the paper before the latter reaches a point at which the paper itself would be torn apart.

Instead of employing staples or other generally similar fastening means such as stitching or the like to hold the folds in normal position I may, as in the form of the invention illustrated in Figs. 8 to 10 inclusive, utilize a suitable adhesive for the purpose by placing a suitable amount of the adhesive 8 at laterally spaced intervals between at least two adjacent folds at each point at which the paper is folded, as shown in Fig 8, or under certain conditions the adhesive may be spread entirely across the strip, the adhesive thus operating to hold the folds in normal position prior to and during the laying of the paper. The adhesive may be either of water soluble character so as to release the folds as soon or substantially as soon as it is exposed to the requisite amount of moisture and thus prior to any material amount of contraction occurring in the paper, or else may be designed to hold the folds in normal position until the holding power of the adhesive is overcome by the contraction of the paper, the adhesive in such case operating in much the same way as the staples or other mechanical fastening means to which reference has heretofore been made. In most cases, however, I prefer to utilize a water soluble adhesive as it avoids any tearing of the paper during the separation of the fold and automatically places the latter in condition to open out as soon as the paper is exposed to a sufficient amount of moisture and thus ordinarily before any material amount of contraction has taken place therein.

Under some conditions I may also omit the staples, glue or other fastening means entirely and simply fold the paper transversely at intervals in the manner hitherto described. Under such circumstances, the folded sections open out more or less into the general plane of the strip when the paper is laid but still afford material capacity for elongation when shrinkage of the paper occurs.

It will thus be apparent that, in accordance with the present invention, I have provided means adapted to yield after the mulch paper is laid in operative position sufficiently to counteract the tension set up in the paper upon shrinkage of the latter which frequently amounts to as much as 1½% and thereby prevent its rupture, and further that said means are of such character as to readily lend themselves to incorporation in the paper during the course of manufacture and prior to its being rolled for shipment to the consumer. Of course when staples or other equivalent mechanical fastening means are employed for holding the adjacent folds of the paper in normal position, said means should be of such character as to readily tear through the paper or otherwise give way before the strain upon the latter becomes excessive and likewise, when a non-water-soluble glue is utilized an amount thereof merely sufficient to accomplish a like result should be employed for a like reason. However, when a water soluble glue or an adhesive which tends to soften under the heat of the sun is utilized, considerably less attention need be given to exact regulation of the proper amount employed, as a glue or adhesive of that character softens rapidly under ordinary conditions after the paper is laid and thus becomes ineffective to hold the folds tightly together before the paper is subjected to any material shrinkage.

While to enable those skilled in the art to practise my invention I have herein shown and described several forms thereof with considerable particularity, I do not thereby desire or intend to limit or restrict the scope of the invention specifically thereto as the invention may be embodied in other forms and/or the details of construction and arrangement modified and varied in the particular embodiments to which I have chosen to refer, without departing from the spirit and scope of the invention as defined in the appended claims.

Having thus described my invention, I claim and desire to protect by Letters Patent of the United States:

1. An elongated strip of mulch paper folded transversely on itself at longitudinally spaced intervals to thereby form spaced groups of overlapping sections in the strip, and water soluble glue disposed between at least two of the adjacent overlapping sections in each group and operative when subjected to a predetermined amount of moisture to permit said sections to separate upon the application of longitudinal tension to the strip.

2. A plant mulch comprising an elongated strip of paper having portions thereof folded upon itself at spaced intervals and means engaging said portions normally operative to maintain said portions in folded relation and operative to release said portions upon saturation thereof with water.

3. A plant mulch comprising an elongated strip of paper having portions thereof folded upon itself at spaced intervals and a plurality of metallic members extending through said folded portions, operative normally to positively maintain said portions in folded relation, and upon saturation thereof with water to releasably maintain said portions in said relation.

4. A plant mulch comprising an elongated strip of paper having a plurality of spaced transverse folds, means operative to positively maintain said folds in substantial parallelism with the strip when dry and to releasably maintain said folds in parallelism with the strip when wet with water.

In witness whereof I have hereunto set my hand this 20th day of May, 1930.

CHARLES J. ALLEN.